US011075860B2

(12) United States Patent
Partridge et al.

(10) Patent No.: US 11,075,860 B2
(45) Date of Patent: Jul. 27, 2021

(54) COLLABORATIVE HELP FOR USER APPLICATIONS

(75) Inventors: Ian O. Partridge, Winchester (GB); Adam J. Pilkington, Winchester (GB); David S. Renshaw, Winchester (GB); Andrew Taylor, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1656 days.

(21) Appl. No.: 13/813,468

(22) PCT Filed: Sep. 7, 2011

(86) PCT No.: PCT/EP2011/065484
§ 371 (c)(1),
(2), (4) Date: Jan. 31, 2013

(87) PCT Pub. No.: WO2012/045545
PCT Pub. Date: Apr. 12, 2012

(65) Prior Publication Data
US 2013/0132497 A1  May 23, 2013

(30) Foreign Application Priority Data
Oct. 4, 2010  (EP) .................................... 10186389

(51) Int. Cl.
*H04L 12/58* (2006.01)
*G06Q 10/10* (2012.01)

(52) U.S. Cl.
CPC ........... *H04L 51/00* (2013.01); *G06Q 10/103* (2013.01)

(58) Field of Classification Search
CPC .................. G06Q 10/107; G06Q 10/10; H04L 29/08072; G06F 8/30; G06F 8/33; G06F 11/3688; G06F 11/3644
USPC ............... 709/204, 205, 206, 217, 218, 219; 717/106, 110, 124
See application file for complete search history.

(56) References Cited

U.S. PATENT DOCUMENTS

| | | | |
|---|---|---|---|
| 6,192,381 B1 * | 2/2001 | Stiegemeier .......... | G06F 40/186 715/210 |
| 6,237,139 B1 * | 5/2001 | Hotta et al. ................... | 717/126 |
| 6,275,978 B1 * | 8/2001 | Bell ........................ | G06F 9/454 717/143 |
| 6,493,703 B1 * | 12/2002 | Knight et al. | |
| 6,981,212 B1 * | 12/2005 | Claussen ............... | G06F 16/986 715/205 |
| 7,047,498 B2 | 5/2006 | Lui et al. | |
| 2003/0145305 A1 * | 7/2003 | Ruggier .................... | G06F 8/38 717/100 |

(Continued)

OTHER PUBLICATIONS

Microsoft Computer Dictionary, 5th edition, copyright 2002, p. 491 (Year: 2002).*

(Continued)

*Primary Examiner* — Backhean Tiv
(74) *Attorney, Agent, or Firm* — Cuenot, Forsythe & Kim, LLC

(57) ABSTRACT

Collaborative help for user applications includes: generating a message, the message being reflective of a user's experience in using a user application; sending the message to a collaborative help server to share the message with other users; and receiving a response from the server providing information regarding one or more other users' experience similar to the user's experience reflected in the message.

20 Claims, 4 Drawing Sheets

(56) References Cited

U.S. PATENT DOCUMENTS

| | | | |
|---|---|---|---|
| 2005/0004682 A1* | 1/2005 | Gaddis | A01F 25/00 700/9 |
| 2005/0071344 A1* | 3/2005 | Chen | G06F 16/86 |
| 2006/0101385 A1* | 5/2006 | Gerken | G06F 8/447 717/106 |
| 2006/0136512 A1 | 6/2006 | Bou-Ghannam et al. | |
| 2007/0022320 A1 | 1/2007 | Flocken et al. | |
| 2008/0104580 A1* | 5/2008 | Wilkinson | G06F 8/433 717/141 |
| 2008/0148110 A1* | 6/2008 | Bhamidipaty | G06F 16/3338 714/57 |
| 2008/0183668 A1 | 7/2008 | Bhamidipaty et al. | |
| 2009/0164589 A1* | 6/2009 | Shroff | G06Q 10/10 709/206 |
| 2010/0106668 A1* | 4/2010 | Hawthorne | G06Q 10/10 706/11 |
| 2010/0161101 A1* | 6/2010 | Pouyez | G06Q 10/10 700/108 |
| 2010/0218173 A1* | 8/2010 | Aharoni | G06F 8/427 717/143 |
| 2010/0280931 A1* | 11/2010 | Lim | G06Q 30/04 705/34 |
| 2011/0239195 A1* | 9/2011 | Lin | G06F 8/71 717/126 |
| 2014/0169767 A1* | 6/2014 | Goldberg | G11B 27/031 386/282 |
| 2015/0026260 A1* | 1/2015 | Worthley | G06F 16/958 709/204 |

OTHER PUBLICATIONS

WIPO Application PCT/EP2011/065484 International Search Report and Written Opinion, dated Jan. 11, 2012, 12 pgs.

* cited by examiner

COLLABORATIVE HELP FOR USER APPLICATIONS

CROSS-REFERENCE TO RELATED APPLICATIONS

This application is the national stage of PCT/EP2011/065484 filed Sep. 7, 2011, designating, inter alia, the United States and claiming priority to European Patent Application No. 10186389.2 dated Oct. 4, 2010, each of which is incorporated herein by reference in its entirety.

BACKGROUND

Users working on an application may need help in operating the application. This is especially applicable to integrated development environments (IDEs) where users are developing software using a software application that provides comprehensive facilities to computer programmers. A computer programmer or developer working in an IDE may come across problems which require help.

Current help services such as inbuilt help systems provide a static list of topics and solutions to common problems. Finding out what page or pages are specific to a user's particular problem can often be time consuming Suggested pages are often not relevant.

BRIEF SUMMARY

A method for collaborative help for user applications includes generating, using a processor, a message, the message being reflective of a user's experience in using a user application. The method further includes sending the message to a collaborative help server to share the message with other users and receiving a response from the server providing information regarding one or more other users' experience similar to the user's experience reflected in the message.

A method for collaborative help for user applications includes receiving a message, the message being reflective of a user's experience in using a user application, storing the message with other messages from other users, and searching, using a processor, the stored messages for similar messages from other users. The method further includes returning a message providing information regarding one or more other users' experience similar to the user's experience reflected in the received message.

A computer software product for collaborative help for user applications includes a computer-readable storage medium having computer readable program code embodied therewith. The computer readable program code is readable by a processor to perform a method including generating, using the processor, a message, the message being reflective of a user's experience in using a user application. The method further includes sending, using the processor, the message to a collaborative help server to share the message with other users and receiving, using the processor, a response from the server providing information regarding one or more other users' experience similar to the user's experience reflected in the message.

A computer software product for collaborative help for user applications includes a computer-readable storage medium having computer readable program code embodied therewith. The computer readable program code is readable by a processor to perform a method including receiving, using the processor, a message, the message being reflective of a user's experience in using a user application and storing, using the processor, the message with other messages from other users. The method further includes searching, using the processor, the stored messages for similar messages from other users and returning, using the processor, a message providing information regarding one or more other users' experience similar to the user's experience reflected in the received message.

A system for collaborative help for user applications includes a processor programmed to initiate executable operations. The executable operations include generating a message, the message being reflective of a user's experience in using a user application. The executable operations further include sending the message to a collaborative help server to share the message with other users, and receiving a response from the server providing information regarding one or more other users' experience similar to the user's experience reflected in the message.

A system for collaborative help for user applications includes a processor programmed to initiate executable operations. The executable operations include receiving a message, the message being reflective of a user's experience in using a user application, storing the message with other messages from other users, and searching the stored messages for similar messages from other users. The executable operations further include returning a message providing information regarding one or more other users' experience similar to the user's experience reflected in the received message.

BRIEF DESCRIPTION OF THE SEVERAL VIEWS OF THE DRAWINGS

The subject matter regarded as the invention is particularly pointed out and distinctly claimed in the concluding portion of the specification. Embodiments of the invention, both as to organization and method of operation, together with objects, features, and advantages thereof, may best be understood by reference to the following detailed description when read with the accompanying drawings in which:

DETAILED DESCRIPTION

Figure 1:
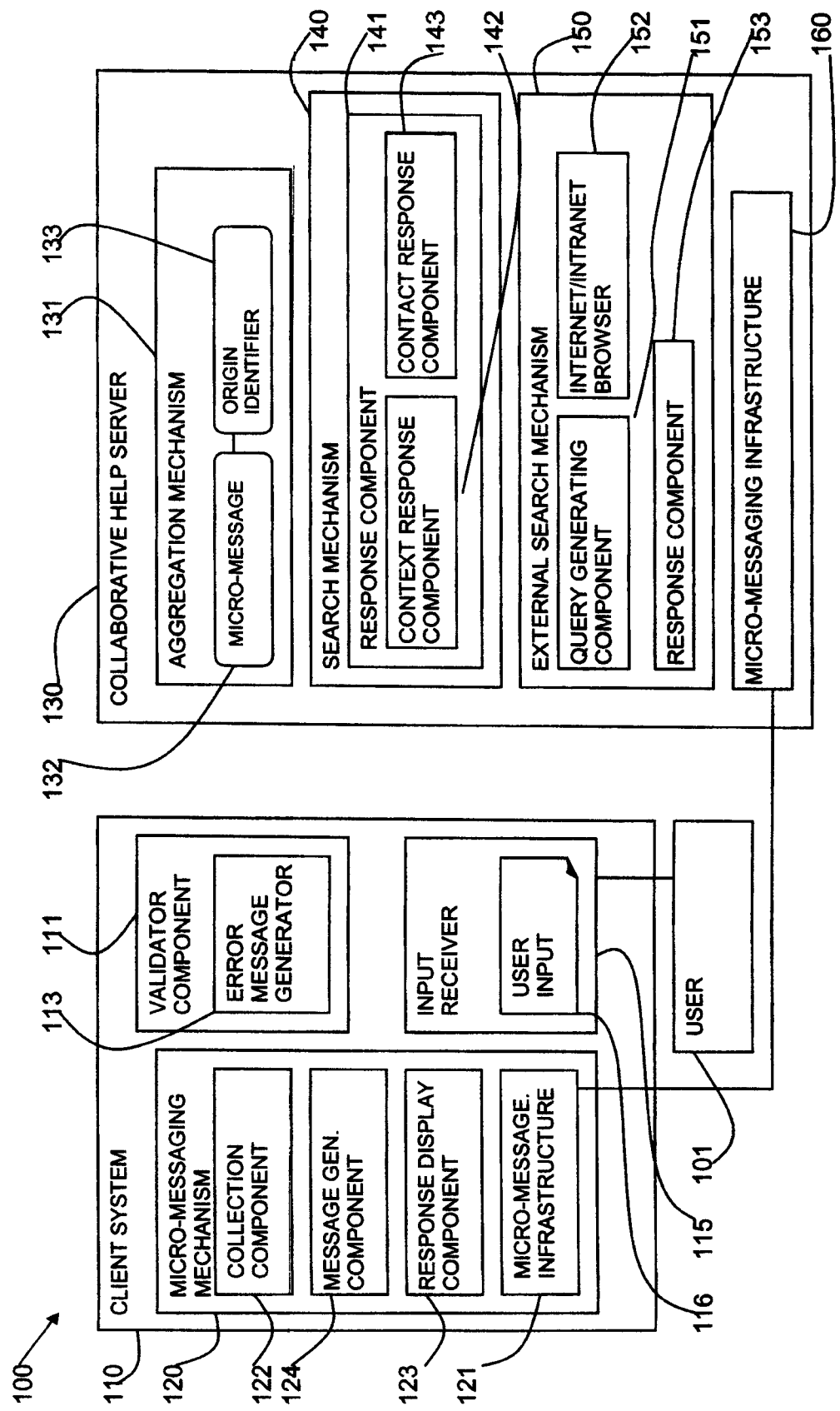
FIG. 1 is a block diagram of a system in accordance with an embodiment of the present invention.

One or more embodiments relate to the field of help for user applications. In particular, one or more embodiments relate to providing collaborative help for user applications.

According to a first aspect of the present invention there is provided a method for collaborative help for user applications, comprising: generating a message, the message being reflective of a user's experience in using a user application; sending the message to a collaborative help server to share the message with other users; and receiving a response from the server providing information regarding one or more other users' experience similar to the user's experience reflected in the message.

According to a second aspect of the present invention there is provided a method for collaborative help for user applications, comprising: receiving a message, the message being reflective of a user's experience in using a user application; storing the message with other messages from other users; searching the stored messages for similar messages from other users; returning a message providing information regarding one or more other users' experience similar to the user's experience reflected in the received message.

According to a third aspect of the present invention there is provided a computer software product for collaborative help for user applications the product comprising a computer-readable storage medium having computer readable program code embodied therewith. The computer readable program code is configured to: generate a message, the message being reflective of a user's experience in using a user application; send the message to a collaborative help server to share the message with other users; and receive a response from the server providing information regarding one or more other users' experience similar to the user's experience reflected in the message.

According to a fourth aspect of the present invention there is provided a computer software product for collaborative help for user applications the product comprising a computer-readable storage medium having computer readable program code embodied therewith, the computer readable program code configured to: receive a message, the message being reflective of a user's experience in using a user application; store the message with other messages from other users; search the stored messages for similar messages from other users; return a message providing information regarding one or more other users' experience similar to the user's experience reflected in the received message.

According to a fifth aspect of the present invention there is provided a system for collaborative help for user applications, comprising: a collection component for collecting events of a user's experience in using a user application; a message generating component for generating a message, the message being reflective of a user's experience in using a user application; a messaging infrastructure for sending the message to a collaborative help server to share the message with other users and for receiving a response from the server providing information regarding one or more other users' experience similar to the user's experience reflected in the message.

According to a sixth aspect of the present invention there is provided a system for collaborative help for user applications, comprising: a messaging infrastructure for receiving a message, the message being reflective of a user's experience in using a user application; an aggregation component for storing the message with other messages from other users; a searching component for searching the stored messages for similar messages from other users; the messaging infrastructure returning a message providing information regarding one or more other users' experience similar to the user's experience reflected in the received message.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method, system and computer program products are described in which help is provided to users of software applications using messages relating to the current operation being performed and any current errors. A user's experience in using a software application and any resultant error notifications are reflected in messages which are aggregated and compared to other users' experiences. Responsive messages provide solutions to the user. This may be applied in any situation where input is provided or content is created by a user and then presented to another part of a system or validated in some way.

The messages used are sufficiently small with a low creation and transmission overhead, so as not to impact the user, for example, by causing screen pausing. Such small messages are referred to as micro-messages.

An aggregating system on a network stores all the messages in sequence for future reference. The system triggers a response if it notes that the user is generating a sequence of messages that look similar to existing known patterns and/or errors for which a solution is known.

The response may be some contextual help or tips. The response may also include links to people who are doing similar things, and those that have completed the task, so that real time collaboration can take place between subject-matter experts. The response may also include results from a related web-search, articles or "how tos" about the topic.

For example, one embodiment of a situation in which the described method may be applied is for individual developers working in an integrated development environment (IDE). In an IDE, content is created by a user writing lines of code and a subsequent or concurrent step is compilation, which will pass or fail.

Another example embodiment of a situation in which the described method may be applied is creation of web applications for server administrative consoles through which web applications are managed. For example, WebSphere Application Server (WAS) Admin Console (WebSphere is a trade mark of International Business Machines Corporation) is used to validate the contents of web applications before they are deployed onto the server. This is done by creating a special type of compressed archive called a WAR (web application archive) file which is then deployed via the administrative console. The console in this case determines if a created WAR file is valid or not.

Referring to FIG. 1, a block diagram shows an example embodiment of the described system 100. The system 100 includes a client system 110 to which a user 101 may input content. The client system 110 may include an input receiver 115 for receiving user inputs 116 from a user 101. The client system 110 may also include a validator component 111 which may include an error message generator 113. The client system 110 may support plugins for additional features.

For example, in one embodiment, the client system 110 may be an IDE for receiving user code and validating the code, including generating error messages. The IDE may include a source code editor, a compiler, a build automator, and a debugger. The IDE may include a graphical user interface via which the user 101 operates in the IDE. The IDE may include further components such as a version control system, class browser, etc.

In another embodiment, the client system 110 may be a server administration console for receiving and validating web applications from a user 101, including generating error messages.

The described client system 110 includes a micro-messaging mechanism 120 which may be in the form of a plugin to the client system 110 or integrated into the client system 110. The micro-messaging mechanism 120 may include a micro-messaging infrastructure 121 for sending and receiving micro-messages over a network. The micro-messaging mechanism 120 may include a collection component 122 for collecting a sequence of operations and a message generating component 124 to form a message to send as a micro-message. The collection component 122 may automatically determine which operations are to be sent as a micro-message.

The collection component 122 of the micro-messaging mechanism 120 may be application dependent. Collection points may correspond to atomic work operations, for example, in the case of an IDE, attempting to compile code would be one point and so would any resulting errors. Alternatively, following steps in a wizard (either through a window or as in the case of a server administration console, a series of web pages) would be sent as messages.

The system 100 may include a collaborative help server 130 which may include an aggregation mechanism 131 for receiving and aggregating micro-messages 132 from multiple micro-messaging mechanism 120 on client systems 110. For example, from multiple IDEs on which users are operating. The micro-messages 132 may be recorded with an identifier 133 of the user or client system providing reference to contact details of the user, for example, instant messaging or email details.

The collaborative help server 130 may include a search mechanism 140 for searching the aggregated micro-messages 132 for similar patterns. Existing data mining/knowledge sharing can be used to search for similar operation sequences at the collaborative help server 130 for passing back to the client system.

The search mechanism 140 may include a response component 141 which may include a context response component 142 for generating contextual help in the form of the possible next steps for a user to perform. The response component 141 may also include a contact response component 143 for obtaining and forwarding contact information of another user or users who have generated micro-messages 132 with similar patterns. The contact response component 143 may check whether the other users are currently online before forwarding their contact information in the form of instant messaging contact details to the current user.

The collaborative help server 130 may also include an external search mechanism 150 including a query generating component 151 for dynamically generating an Internet/intranet search query from a micro-message 132. The external search mechanism 150 may include an Internet/intranet browser 152 for searching using the generated query. The external search mechanism 150 may include a response component 153 for returning top hits from the Internet/intranet query. Specific databases may be searched by the external search mechanism 150, for example, educational courses databases to find suitable help courses for the user.

The collaborative help server 130 may include a micro-messaging infrastructure 160 for sending the generated responses back to the client system's 110 messaging infrastructure 121 for display to the user 101 via a response display component 123.

An embodiment of the described system may use the Eclipse IDE (Eclipse is a trade mark of The Eclipse Foundation) with a custom plugin utilizing a micro-messaging infrastructure. The plugin communicates with a server running on the network.

Existing technologies of micro-messages can be used to relay information to the server and also pass information back to the user. Any messaging system capable of the transmission and delivery of messages may be used. For example, micro-messaging technologies may include Twitter (Twitter is a trade mark of Twitter, Inc.) or MQ telemetry transport (MQTT) protocol (MQ and MQTT are trade marks of International Business Machines Corporation).

In one example embodiment, micro-blogging messaging systems such Twitter may be used. "Tweets" using the Twitter application programming interface sent over the Twitter messaging system consist of short message strings, less than 140 characters, and are sent to the messaging server using HTTP (Hypertext Transfer Protocol).

In another embodiment, a lightweight publish/subscribe messaging may be used such as the MQTT protocol which uses TCT sockets as the network transmission technology and a defined message structure (for example, including header, contents, etc.).

As the user performs tasks, and may receive error messages, micro-messages are transmitted across the network.

The server receives the message(s) and catalogues/stores them internally. Having stored them it searches its database for similar message patterns to those received from other users. If a match is found, the server sends back the results of its analysis. This might include:

Contextual help suggesting possible next steps;
Top hits from a dynamically generated Internet or intranet search query, including details of suitable educational courses;
Instant messaging links to other users who have carried out similar tasks successfully and who are online; and
Email links to other subject matter experts.

This pattern of operations continues in real time, based on the actions/input of the user.

Figure 2:
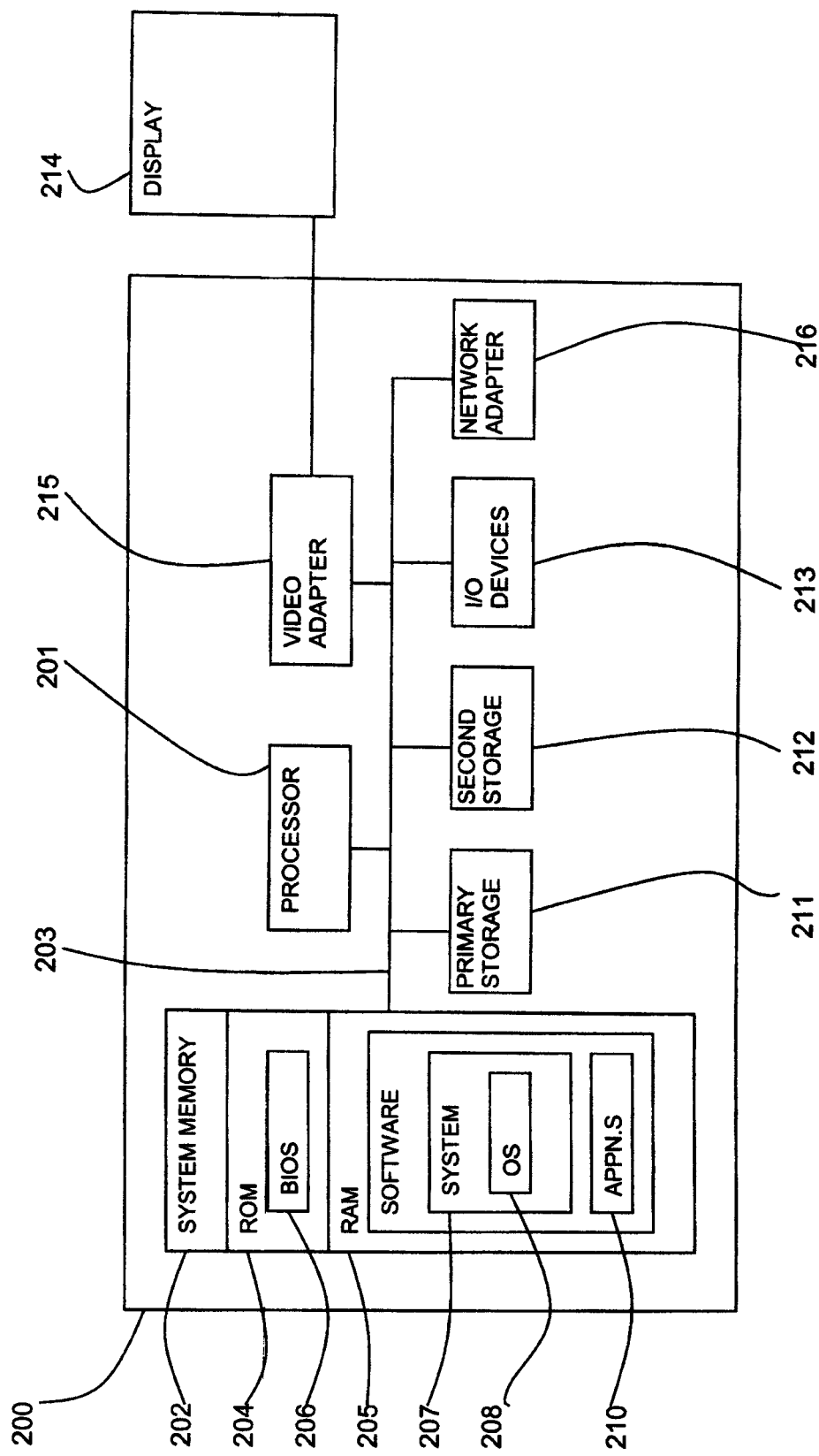
FIG. 2 is a block diagram of a computer system in which one or more embodiments of the present invention may be implemented.

Referring to FIG. 2, an exemplary system for implementing aspects of the invention such as a client system and the collaborative help server include a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

This system could operate in either an intranet or Internet environment, or a combination. Users could choose which is more appropriate, depending on the project being undertaken, and other factors such as whether open source software is being used.

Figure 3:
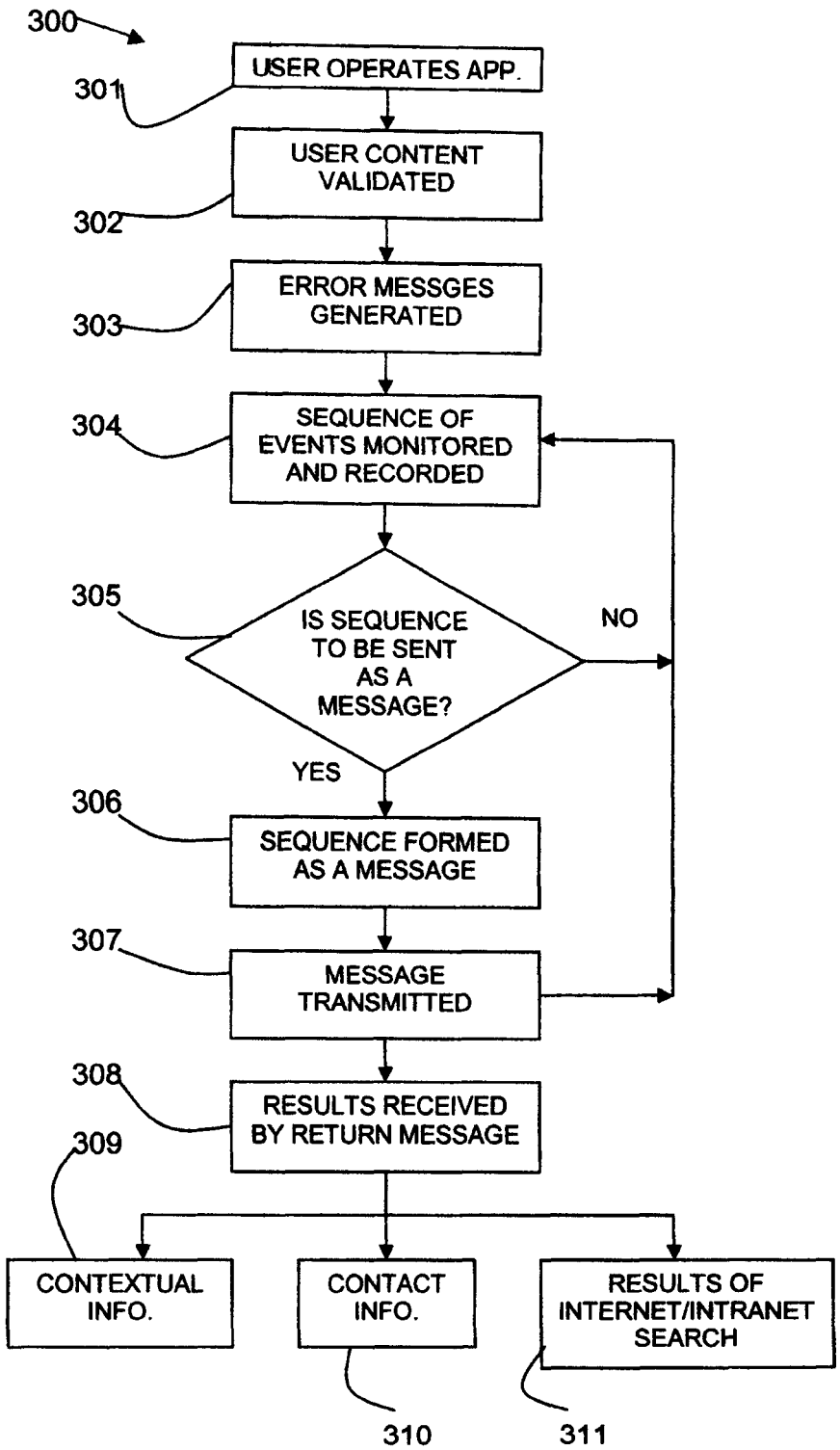
FIG. 3 is a flow diagram of a method in accordance with an embodiment of the present invention.

Referring to FIG. 3, a flow diagram 300 shows an embodiment of the described method.

A user operates 301 in a software application, for example, an IDE or developing web applications for a server administration console. The operations of the user may be validated 302 and error messages generated 303 as appropriate.

A sequence of events may be recorded 304 such as a sequence of inputs, a sequence of results of inputs, error messages, etc.

It is determined 305 if a sequence is to be sent as a message. This determination 305 may be carried out by pre-defined criteria including message length, inputs in the sequence, etc. If it is determined 305 that a message is not yet ready to be sent, the process continues to monitor the recorded sequence of events. If a message is to be sent, the sequence of events is formed 306 as a message.

The message is transmitted 307 by a suitable transport protocol. In example embodiments, the messages are below a predetermined size and sent as micro-messages via a micro-blogging system or a micro-messaging publish/subscribe system.

Multiple messages may be formed 306 and transmitted 307 during a user's session.

Results may be received 308 by return message. The results may take different forms, including contextual information 309, for example, the next steps in the sequence of events, or a corrected sequence of events to help the user. Contextual information results 309 are ranked by the frequency of the information result. Therefore, steps resulting in a successful conclusion which are used more often, are ranked higher in the results.

Another form of result may be contact information 310 to enable the user to contact other users working with the same sequence of events. The contact information 310 may be email, or instant messaging with an indication of whether the user is currently online.

Another form of result may be results from an Internet or intranet search 311 where the sequence of events has been transformed into an Internet or intranet search query and the resultant hits returned.

Figure 4:
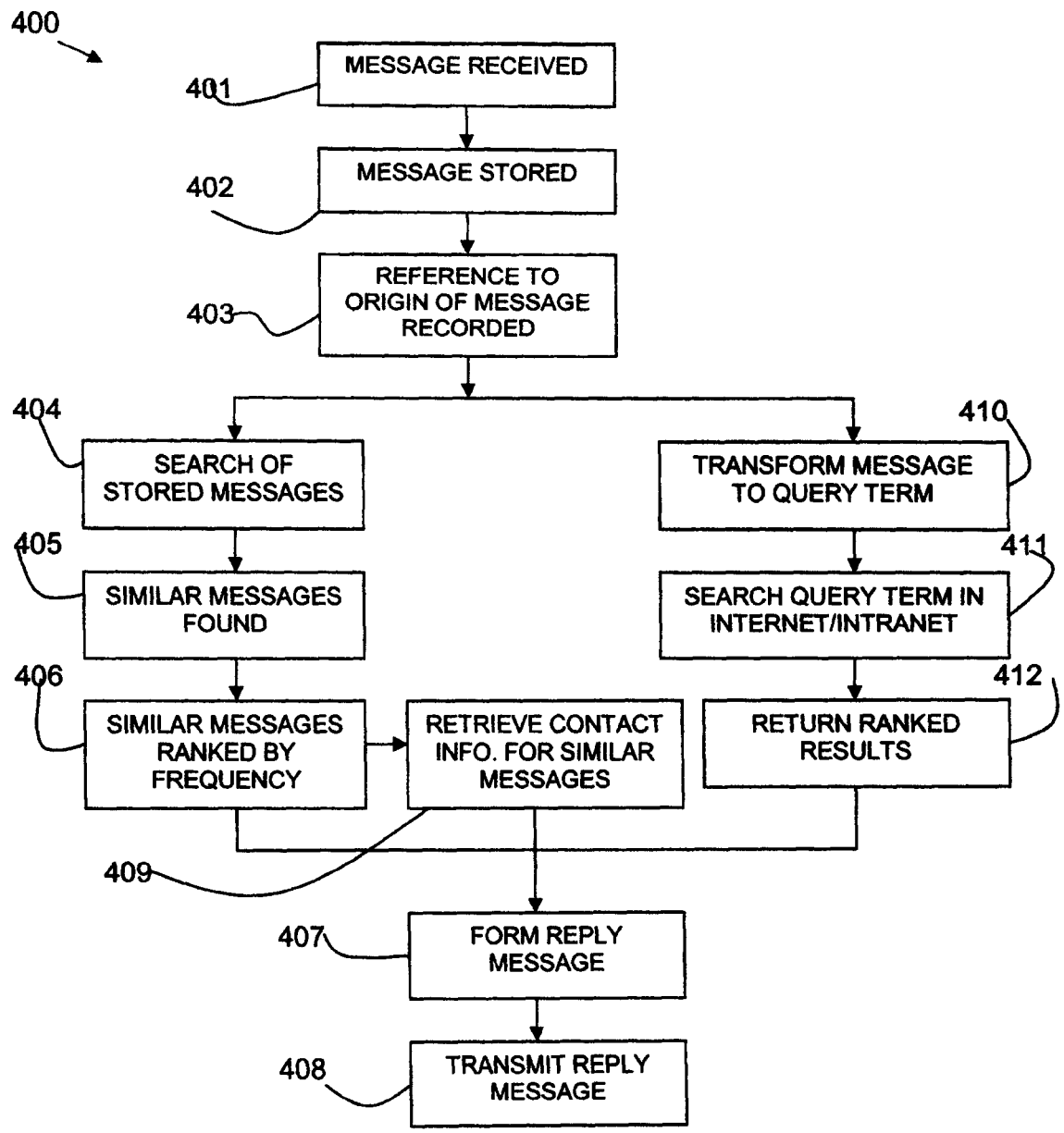
FIG. 4 is a flow diagram of a method in accordance with another embodiment of the present invention.

Referring to FIG. 4, a flow diagram 400 shows another embodiment of the described method carried out at a collaborative help server.

A message is received 401 in the form of a sequence of events relating to a user's operations, which may also include error messages. The message may be stored 402 and, optionally, catalogued. A reference to the message origin may also be recorded 403 including contact information for the user generating the message.

A search of the stored messages may be carried out 404 for messages including similar patterns of events. Similar messages may be found 405 and ranked 406 by frequency.

The ranked similar messages may be formed 407 as a reply message and transmitted 408 back to the user's system as contextual results.

Contact information of the similar messages may be retrieved 409 and formed 407 as a reply message and transmitted 408 back to the user's system as contact information results.

Optionally, simultaneously with the search of stored messages 404, the received message may be transformed 410 into a query term and the query term searched 411 in the Internet or an intranet. Ranked results of the search may be returned 412 and formed 407 as a reply message and transmitted 408 back to the user's system as Internet or intranet results.

Working examples of the use of the described method and system are given below.

In one example, the user creates a java class (Java is a trade mark of Sun Microsystems, Inc.) in an IDE, and compiles it.

- User executes the "New Class" wizard in their IDE.
- User provides basic details of the class e.g. name, superclass type, package etc. to the wizard.
- The user types some code for method bodies, member variables etc. in the class.
- User compiles the class they have created and is notified of compilation errors.
- In response, the IDE sends a micro-message including information about the types of errors to the collaborative help server.
- The collaborative help server compares the user's operation and its results with an internal knowledge base and other potential external sources (e.g. Google (Google is a trade mark of Google, Inc.).
- If the collaborative help server spots a known usage pattern or has information to provide back to the user, it responds to the IDE with a micro-message, possibly including pointers to information, links, documentation, etc.
- The IDE then presents this information to the user.

In a second example, the user deploys a web application.

- User starts the web application deployment wizard in the application server administration console.
- User completes basic information, such as: archive filename, datasource names, JNDI binding etc.
- As she progresses through each page of the wizard, the system sends micro-messages to the aggregation service.
- User attempts to deploy the web application but receives errors.
- In response, the administration console sends a micro-message including information about the types of errors to the collaborative help server.
- The collaborative help server compares the user's operation and its results with an internal knowledge base and other potential external sources (e.g. Google).
- If the collaborative help server spots a known usage pattern or has information to provide back to the user, it responds to the administration console with a micro-message, possibly including pointers to information, links, documentation, etc.
- The administration console then presents this information to the user.

In a third example, the user submits an expense claim through a tool (for example, online via a form, or a bespoke piece of software). Perhaps there is some missing or mismatching information that causes the submission to fail.

Many web applications are a series of pages which must be completed in turn. Similarly to the previous examples, such applications could cause the collaborative help server to dynamically generate context-sensitive help to application users.

A further example is provided with respect to a user using a wizard.

User A initiates a wizard, and as previously, all steps are communicated to the collaborative help server.

User A gets an error message when attempting to deploy.

User A corrects errors and redeploys successfully. This sequence has been logged and remembered by the collaborative help server.

When user B initiates the same wizard, the collaborative help server notices a similar or identical flow of information being provided, and can preempt the user's imminent failure by advising the user on the correct next step to follow.

The described method and system provide help, tips, guidance and networking to computer users (for example, developers) encountering problems. The approach is to share all information and error messages between a broad set of users. When shared messages indicate a common thread of issues or problems, two or more users can be matched and put in contact with each other. When a user resolves a problem or has feedback on an issue or task, he/she can author tips, help or guidance which can be shared with other users receiving messages exhibiting similar problems.

Users can effectively share their experience of performing tasks and the follow-on steps they performed in an automated fashion. This may be provided as a background process without the input of the user.

Aggregating series of operations in sequence determines whether other users are performing the same types of operations.

The method is dynamic and both successful and error situations contribute to the available knowledge bank. Additionally, the method puts real people in direct instantaneous contact with each other rather than regurgitating static data.

The success/failure in a task automatically makes the user a provider of help to another user in the future. A user contributes to the system by successfully completing a task, which information then becomes available to other users who may be experiencing problems with a similar task.

The system is two-way focused, and also dynamically updates based on what people do over time, so the suggestions can be improved.

A user assistance method is provided in which informational and error messages are shared amongst a community of users of applications, and where a match is made between patterns of messages to put one user in contact with another who has faced similar problems.

Product creators can trawl messages relating to their system to see where people are having problems, for example wizards creating non-functional code, or unexpected usage patterns.

Product creators could receive suggestions for common tasks performed in their application which might benefit from a "wizard" or guided task-flow, and suggestions for API changes if a certain sequence is always required.

Experts who have been consulted by other users can then contribute solution steps that will be returned to users when the problem is encountered.

A collaborative help system may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A computer-implemented method within an integrated development environment (IDE) including a source code editor, comprising:

receiving, by the source code editor and from a user, source code;

validating, using the IDE, the source code;

generating, based upon the validating, an error message associated with the source code;

generating a message that includes the source code, the error message, and is reflective of the user's experience in using the source code editor;

sending the message to a collaborative help server; and receiving, a response from the collaborative help server, a response that provides information regarding another user's experience similar to the user's experience reflected in the message.

2. The method as claimed in claim 1, wherein
the message further includes a sequence of inputs within the source editor.

3. The method as claimed in claim 1, wherein
the information in the response is contextual information providing a solution to the user's experience reflected in the message.

4. The method as claimed in claim 1, wherein
the information in the response is the another user's contact information to provide direct collaboration between the users.

5. The method as claimed in claim 4, wherein
the contact information indicates whether the another user is currently online.

6. The method as claimed in claim 1, wherein
the response from the collaborative help server provides a ranked list of other users' experiences.

7. The method as claimed in claim 1, further comprising:
receiving a second response from the collaborative help server including results of an Internet or intranet search for a query based on the message.

8. The method as claimed in claim 1, wherein
the sending the message and the receiving the response is by a micro-messaging infrastructure.

9. A computer hardware system including an integrated development environment (IDE) and a source code editor therein, comprising:
a hardware processor configured to initiate the following executable operations:
receiving, by the source code editor and from a user, source code;
validating, using the IDE, the source code;
generating, based upon the validating, an error message associated with the source code;
generating a message that includes the source code, the error message, and is reflective of the user's experience in using the source code editor;
sending the message to a collaborative help server; and
receiving, from the collaborative help server, a response that provides information regarding another user's experience similar to the user's experience reflected in the message.

10. The system of claim 9, wherein
the message further includes a sequence of inputs within the source editor.

11. The system of claim 9, wherein
the information in the response is contextual information providing a solution to the user's experience reflected in the message.

12. The system of claim 9, wherein
the information in the response is the another user's contact information to provide direct collaboration between the users.

13. The system of claim 12, wherein
the contact information indicates whether the another user is currently online.

14. The system of claim 12, wherein
the response from the collaborative help server provides a ranked list of other users' experiences.

15. The system of claim 9,
a second response is received from the collaborative help server including results of an Internet or intranet search for a query based on the message.

16. The system of claim 9, wherein
the sending the message and the receiving the response is by a micro-messaging infrastructure.

17. A computer program product, comprising
a hardware storage device having stored therein program code, which when executed by a computer hardware system including an integrated development environment (IDE) and a source code editor therein, causes the computer hardware system to perform:
receiving, by the source code editor and from a user, source code;
validating, using the IDE, the source code;
generating, based upon the validating, an error message associated with the source code;
generating a message that includes the source code, the error message, and is reflective of the user's experience in using the source code editor;
sending the message to a collaborative help server; and
receiving, from the collaborative help server, a response that provides information regarding another user's experience similar to the user's experience reflected in the message.

18. The computer program product of claim 17, wherein
the message further includes a sequence of inputs within the source editor.

19. The computer program product of claim 17, wherein
the information in the response is contextual information providing a solution to the user's experience reflected in the message.

20. The computer program product of claim 17, wherein
the sending the message and the receiving the response is by a micro-messaging infrastructure.

\* \* \* \* \*